July 1, 1941.  A. G. RAYBURN  2,247,850
REFRIGERATION METHOD AND APPARATUS
Filed June 21, 1938  2 Sheets-Sheet 1
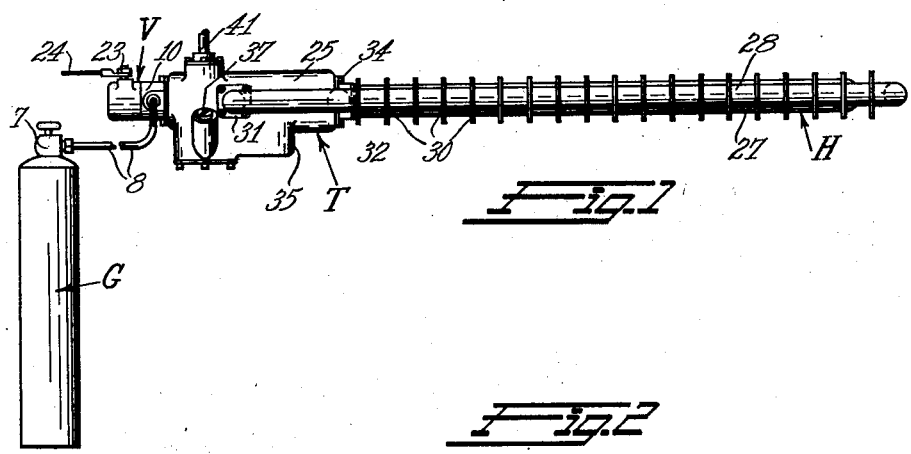
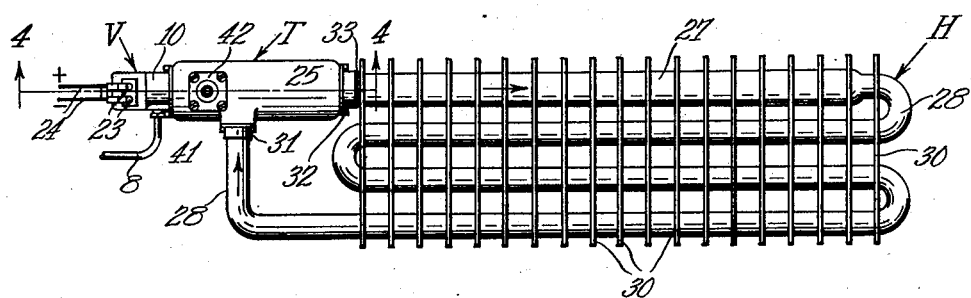
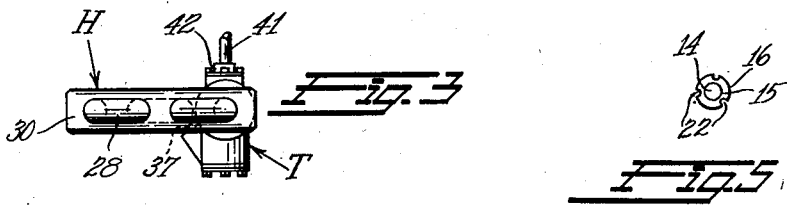
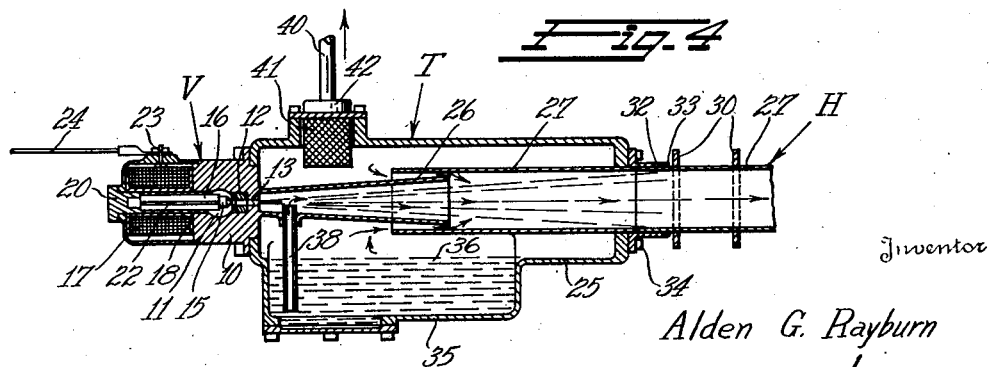
Inventor
Alden G. Rayburn
By Ralph L. Stevens
Attorney

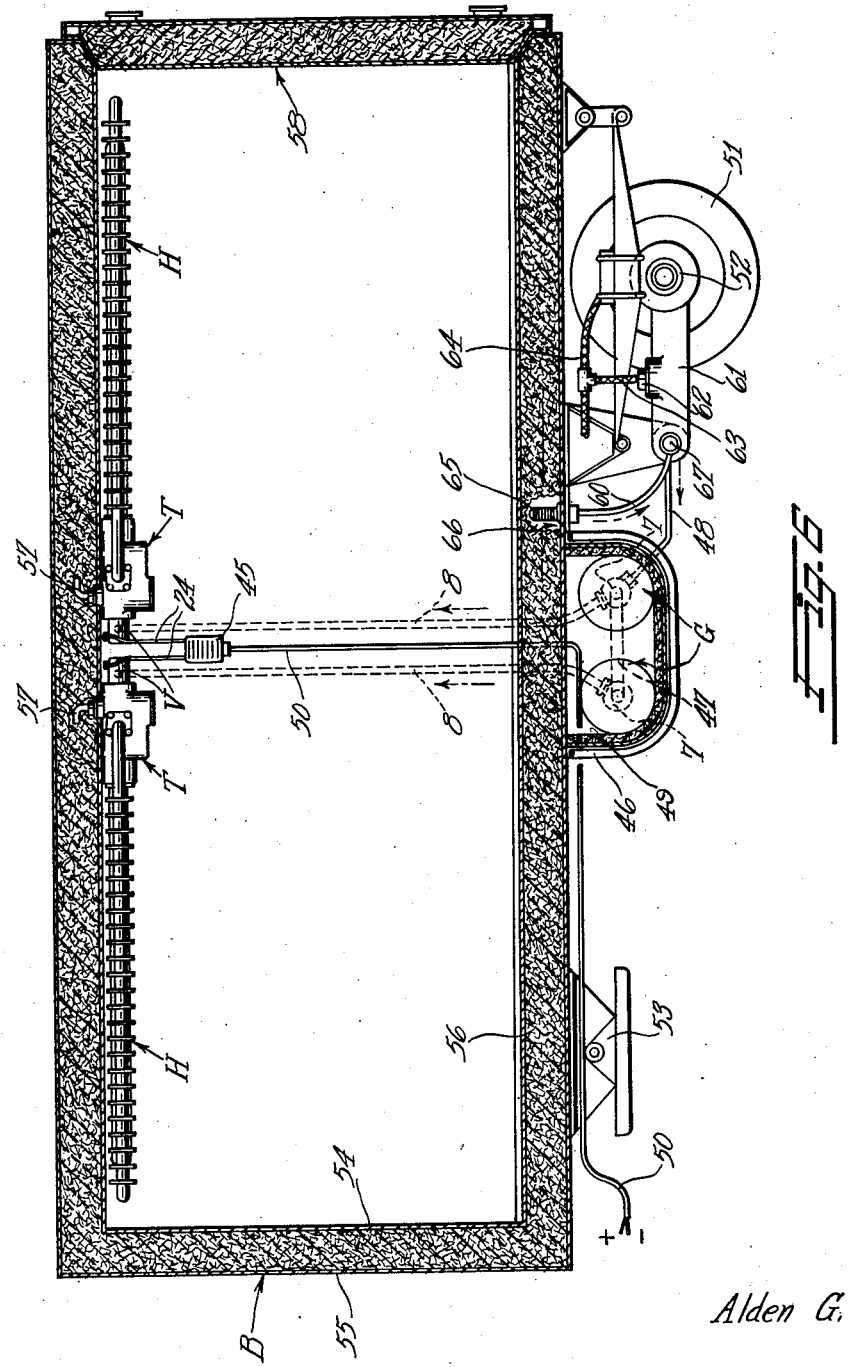

Patented July 1, 1941

2,247,850

UNITED STATES PATENT OFFICE 2,247,850

REFRIGERATION METHOD AND APPARATUS

Alden G. Rayburn, Sausalito, Calif., assignor of one-half to William H. Brooks, San Francisco, Calif.

Application June 21, 1938, Serial No. 215,010

12 Claims. (Cl. 62—92)

The present invention relates to improved refrigerating systems, involving new and useful cooling methods and apparatus. More particularly, this invention is concerned principally with the refrigeration of food products in transit; and especially with efficient and safe handling, including both transportation and distribution, of very cold or frozen foodstuffs.

The advent of frozen food products with the increasing need for low and sub-zero temperatures to properly preserve them, has produced a serious problem in refrigeration. So far, attempts to efficiently produce these lower temperatures by means of mechanical compressor units of relatively small size, has proved expensive and not wholly satisfactory from a commercial and service viewpoint, as initial and total costs prove to be necessarily larger than the average store keeper can afford to pay. For these reasons, the frozen foods distributors have been unable to expand their sales as fast as the merit of their products warrant and are expending large amounts of money to solve this problem of distribution and to supply dispensing cabinets and transportation units capable of producing these lower temperatures efficiently and at low cost.

Food products requiring these lower temperatures are being frozen initially in large quantities by special methods developed for the purpose which operate in conjunction with large refrigeration plants using ammonia as the refrigerant. The great compressors built with large capacity are of reasonably high efficiency and perform the function for which they are designed, but when these frozen products leave the freezer and cold storage rooms and must be transported to distant points for distribution, either by rail or truck, the problem arises of providing these lower temperatures in both the truck and railroad car. Sustained low temperatures are vital to the preservation of the original quality of the product. Moreover, upon arrival at a distant point the frozen foods products must be again handled in such a manner as to maintain the correct lower temperatures within the required limits; and finally they must be stored in cabinets and storage rooms in the wholesale house or retail store, where they are necessarily divided up into smaller quantities in selected groups or units for sale.

The problem, of refrigerating railroad cars, is one that has defied solution for a long time. Any system to be really successful in this field should be simple, reliable, of low initial cost, low servicing cost and economical in operation. In addition it should be capable of supplying the low temperatures required for the various types of refrigerated products transported, and of maintaining the required temperatures within a close differential of temperature.

As a complete solution to the problem of refrigerating railroad cars, truck and trailer bodies and frozen foods dispensing cabinets, I have discovered a new system of refrigeration. My discovery consists of a simple means for generating extremely low temperatures and then applying them, by means of a liquid carrier to a heat exchange system, after said carrier has become charged, so to speak, with these low temperatures at the immediate point of generation. The circulation of the carrier through the heat exchange system is accomplished by means of the expansion energy of a compressed gas as it expends itself through an expansion and conduction tube. In operation the carrier picks up heat and brings it to the low temperature generating source, where the heat is extracted instantly and with high efficiency. The source of power consists of a cylinder or storage tank of liquefied gas (preferably $CO_2$) which has been charged under a predetermined high pressure at a station suitable for such a purpose. This supply of gas energy is sufficient to operate the refrigeration system for a given length of time previously determined. The gas is conveyed to a generator unit by means of high pressure tubing and the rate of flow is controlled by means of a valve mechanism, which may be opened and closed either at regularly timed intervals or automatically in response to temperature variations.

In the disclosure of my invention about to be made, I provide a positive type valve operated by a magnetic solenoid in conjunction with a thermostatic control located in the space to be refrigerated. High pressure $CO_2$ gas is connected to an expansion nozzle of the generator unit under positive control of the magnetic valve and expands at a high rate through a small hole into the said nozzle. Methanol alcohol (a synthetic alcohol with practically no odor) is sprayed into the gas as it rushes through the nozzle and out through a suction creating tube into the heat exchange system. The $CO_2$ gas becomes heavily laden with alcohol vapor or fog which at the same time is brought to the extremely low temperatures developed by the expanding gases (minus 110° F. or lower) and is brought into full and intimate contact with the metal walls of the tubing of the heat exchange system and then is caused to circulate through the length of tubing many times before it is fully allowed to pass out of the system into the insulation which surrounds the refrigeration compartment. As soon as the heat is extracted from the compartment in an amount required, the thermostat closes the valve and shuts the gas pressure off from escape into the generator. The gas held in the storage tank then remains there without loss and is ready for instant use to refrigerate.

As can be seen, a refrigeration system such as just described has but one moving part; has its source of energy in storage form, held in convenient steel cylinders which can be mounted in any convenient position on the railroad car, truck body or cabinet as the case may be; will not be subject to stand-by losses because the stored energy will last as long as the pressure remains abundant enough to provide low temperatures; will be readily recharged by replacement of cylinders or recharging from special truck charging units; is inexpensive to install; and is highly efficient as an exchange system for heat, and thoroughly reliable, which is of utmost importance for safe handling of perishables.

Most of the objects of the present invention are indirectly expressed in the foregoing discussion, and only the principal objects will be restated or emphasized here.

It is a major object of this invention to utilize escaping compressed gas for the production of low refrigerating temperatures, and to control the escape automatically in response to variations in the produced temperatures.

Another major object resides in the utilization of a liquid in the form of particles or vapors as a heat exchanging and carrying agent in association with a circulated expanding gas, and in this connection in utilizing the energy of the flowing gas to atomize or vaporize the liquid.

It is a further highly important object of the present invention to devise a low temperature refrigeration system embodying a liquefied gas stored under high pressure and releasable for expansion and circulation in a circuit that is not fully or constantly closed, so that a partial re-circulation of the gas takes place, and in this connection to gradually release the used gas into an insulating space surrounding the chamber or other device that is being cooled.

It is also a major object to devise a refrigerating system embodying a stored high pressure gas and a means for recompressing and restoring the used gas of the system for further use. Other objects reside in novel ways and means for accomplishing the recompression.

The foregoing and other objects of my invention will clearly appear from a study of the following detailed description when taken in conjunction with the accompanying drawings and the appended claims. In the drawings:

Fig. 1 is a view in side elevation of a preferred form of apparatus embodying the present invention and operable to carry out the method thereof.

Fig. 2 is a top plan view of the same apparatus, with the gas storage cylinder omitted.

Fig. 3 represents an end view as seen when looking toward the right-hand end of Fig. 1.

Fig. 4 is an enlarged view, in vertical section, of the low temperature producing unit of Figs. 1 to 3, as seen when looking toward the plane of line 4—4, Fig. 2.

Fig. 5 is a face view of the fluid-control end of the valve unit seen in Fig. 4.

Fig. 6 represents a vertical section taken substantially centrally and longitudinally of a semi-trailer which carries two of the refrigerating systems of Figs. 1 to 5 as well as means for controlling and re-energizing said systems.

With continued reference to the drawings, wherein like characters are employed to designate like parts, and with particular reference first to Figs. 1 to 5, the illustrated refrigeration system consists essentially of a high pressure gas tank G, a low temperature producing unit indicated generally at T and connected to said tank, a valve device V for automatically controlling the flow of gas from the tank to the unit T, and a heat exchanging and gas circulating device H connected to the unit T.

The tank G comprises a relatively heavy metal cylinder in which a gas such as $CO_2$ is stored in liquefied form under very high pressure and which has a manual control valve 7 through which the gas is fed to the unit T by way of a pipe or tube 8. Any gas capable of compression, and subsequent expansion to produce the desired low temperature for a given installation, may be used, but $CO_2$ gas is preferred for several reasons. It is less dangerous than most other gases, it is normally free from water vapor which is likely to cause trouble at low temperatures, it does not have a corrosive effect on the parts and it affords a good carrier for the heat exchange liquid or vapor particles. Finally, it is obtainable cheaply and can be efficiently utilized to produce extremely low temperatures during expansion.

The discharge end of the tubing 8 is tightly connected to a block 10 which forms part of the valve device V and opens into a bore 11 in the latter. This bore is otherwise closed to external communication, but it is laterally recessed to receive a hollow valve seat member 12 that is aligned with a passage 13 for communication with the unit T. The valve seat is shaped to complementally receive the conical end 14 of a valve element 15 that is integral with or secured to an enlarged stem 16. At least the stem portion is formed of iron or other magnetic material so that it forms the core of a solenoid coil 17 designed and arranged to pull the valve axially off its seat when energized.

A sleeve 18 slidably receives the stem 16 and is sealed at its outer end by an integral head 20, which also serves to hold a solenoid case 21 in position upon the block 10. The inner end of the sleeve 18 is screw threaded into or otherwise suitably secured and sealed with respect to the block 10. The stem 16 is provided with one or more longitudinal grooves 22 on its surface to equalize the pressure at the outer end of the valve with that in the bore 10, so that the valve will automatically seat when the solenoid is de-energized. The seating action may be made more positive by placing a small compression spring between the head 20 and the outer end of the valve stem.

Terminals 23 for the solenoid coil are mounted on the case 21 to receive electrical wires 24, the latter being connected to a thermostat-switch (see later discussion of Fig. 6) for automatic control of the valve element 15 in response to preselected temperatures at the point of location of the thermostat. Ordinarily this point is within a chamber to be refrigerated.

The block 10 is fitted to an opening in a housing 25 that forms part of the unit T, and is secured and sealed with respect to this opening in any suitable manner. An expansion nozzle 26 is secured to or formed integral with the block and projects into the housing to form, in effect, a part of the unit T. This nozzle is in the form of a somewhat elongated frustro-conical sleeve having its axis substantially aligned with the passage 13, so that when the valve element 15 is unseated the high pressure gas rushes into and through said nozzle with rapid expansion to create low temperatures.

The outwardly flaring end of nozzle 26 extends, with material annular clearance as shown, into one end of a gas expansion and heat transfer tube 27 that is substantially aligned with the nozzle and that projects through and beyond one wall of the housing 25 into connection with a gas circulating and heat exchange pipe 28. The latter preferably is coiled or looped to form, with the tube 27 and a multiplicity of metal fins 30, a compact heat exchange unit. The return or discharge end of pipe 28 opens into one side of the housing 25 and is secured thereto by a flanged coupling 31. The tube 27 may be made for convenience in two sections as shown (Fig. 4) joined endwise externally of the housing and held in sealed and positioned relation thereto by a flanged sleeve 32 in any suitable manner. For example the sleeve may be welded to the tube at 33 and anchored to the housing by cap screws 34.

The housing 27 is shaped to form an integral reservoir or sump 35 which is filled with a liquid 36, such as methanol alcohol, substantially to the level indicated (Fig. 4). For this purpose a filler cap 37 is provided. An atomizer tube or nozzle 38 is secured to the flaring gas nozzle 26 adjacent the small end of the latter so that one end of the atomizer nozzle projects into proximity with the high velocity blast of gas that issues from port 13 when the control valve is open, while the other end of said nozzle (38) extends to a point adjacent the bottom of the reservoir 35. Therefore, in operation the gas blast draws a small jet stream of the liquid upwardly through the nozzle 38, atomizes it and projects the minute liquid particles outwardly through the tube 27 in thorough admixture with the expanding gas. The commingled materials circulate through the pipe 28 and return to the space surrounding nozzle 26 and tube 27, whereupon most of the liquid particles settle into the liquid body 36, while much of the gas reenters the tube 27 by way of the annular clearance around the nozzle 26 and is recirculated.

A part, however, of the expanded gas escapes into a pipe 40 by way of a filter unit 41 which preferably is designed to resist the escape of liquid particles and vapors. The pipe 41 is united to the top of the housing 27 by a coupler 42 and may discharge to atmosphere or any desired point. Preferably, however, it will include a selectively preloaded pressure release valve, and will be discharged into the insulating spaces surrounding a refrigerated storage chamber or the like (as in Fig. 6, later described).

The liquid 36 must be capable of remaining quite fluidic under very low temperatures, which may be as low as 110° below zero F. or lower, it must not cause corrosion, it must be capable of atomization and circulation and it must be a fairly good heat conductor in order to transfer heat rapidly from the metal of the unit H to the circulating mixture. Other liquids having these characteristics will suffice, but methanol alcohol is preferred for highest all-around efficiency.

Operation of single system

The operation of the described apparatus of Figs. 1 to 5 has been covered but a summary may be helpful at this point. With the unit H—and preferably the entire system with the possible exception of the gas cylinder G—disposed within any chamber to be refrigerated, and with the latter calling for a low temperature through its thermostat, the valve 15 is opened by the solenoid 17 and the released liquefied gas is permitted to expand very rapidly in the flaring nozzle 26. Any tendency for the gas to form "snow" particles is minimized by addition of liquid through tube 38 in conjunction with recirculated gas entrained at the outlet of nozzle 26. The particles of atomized liquid reach substantially the same low temperature as the gas at any point along the tubing through which they are projected and carried, and when they impinge upon the tubing walls they take up heat much faster than would the gas molecules and quickly transfer their acquired heat to the latter. Any liquefied vapor or particles that condense or adhere to the walls of the pipe 28 will flow downwardly and eventually be returned by gravity to the reservoir 35. Recirculation of some of the gas and liquid, and escape of some of the used gas, take place as previously explained. The control valve of course is shut off automatically through solenoid deenergization when the desired cooling has been accomplished, and the remaining compressed gas in the cylinder G is reserved for later use as needed.

When initially bringing the refrigerated chamber down from atmospheric temperature the gas discharged from pipe 41, being at relatively low temperature, may be conveyed directly into said chamber to partially chill the latter, and thereafter diverted into the insulation surrounding the chamber. The rate of escape of gas through the filter unit 41 is somewhat automatically controlled in desirable manner by the temperature variations outside the unit H. When such temperatures are high they cause a more rapid expansion of the gas in the unit H with attendant higher pressures and more rapid escape, and as said temperatures become lower the rate of escape is correspondingly reduced. If a preloaded pressure relief valve is placed in the line 40 it may be set to open fully during initial cooling, and to open to lesser degrees as the pressure decreases in response to acquisition of less heat by the circulating gas from the refrigerated chamber. Further automatic control may be obtained by placing the tank G within the chamber being refrigerated, to cause the tank pressure to be less after cooling than during the initial cooling period when the temperature of the chamber is relatively high. Normally, however, the tank will be disposed externally where it can readily be exchanged for a new cylinder G when needed and where it does not detract from the food storage space.

Installation of Fig. 6

In the installation shown in Fig. 6, a pair of the assemblies V, T, H is shown within the refrigerated chamber of a trailer body B, under the control of a common thermostat 45. The twin assemblies occupy a minimum space in out-of-the-way and efficient cooling location adjacent the ceiling, to which they may be secured in any suitable manner; and their individual gas supply tanks G are underslung compactly by a cradle 46 secured to the bottom of the body B. The cradle has an insulated lining 49 which preferably, in cooperation with the bottom of the body, fully houses the tanks to protect them from heat and dust. The tanks may be interconnected by a pipe 47, this being particularly desirable when the tanks are to be recharged through a common pipe 48 in a manner presently described. A conduit 50 carries electrical wires for supplying current from the tractor or truck to the solenoids by way of the thermostat 45. Of course a direct controlled mechanical thermostatic valve may be used in place of electrical types.

The rear end of the body is sprung conventionally on road wheels 51 supported by an axle 52, and the front end carries a conventional coupler 53 by means of which it is to be supported and drawn by the truck or tractor. The body itself may comprise an inner imperforate lining wall 54 and an outer imperforate sheathing 55 spaced apart by suitable frame members (not shown) to receive a light heat-insulating material 56 of the type embodying minute air pockets into and through which a gas may flow. The cooling systems embody outlet nozzles 57— in lieu of the pipes 41 of Figs. 1–4—through which the used but relatively cold $CO_2$ gas is discharged into this material 56. A door 58, insulated as shown, is mounted at the rear of the refrigerated chamber.

A conduit 60 may be employed to vent the insulation 56 to a compressor driven by any suitable moving part of the truck or trailer for the purpose of recompressing the expanded and escaped $CO_2$ gas and returning it to the tanks by way of the conduit 48. In the illustrated form this compressor takes the form of a multi-stage pump 61 driven by the axle 52 or one of its wheels 51. Preferably, in order to utilize normally wasted energy for this purpose, the compressor 61 will be placed under load when the brakes are applied or just as the brakes are about to take hold. This may be done by equipping the compressor with a standard unloader valve 62 which normally by-passes the compression stroke or lifts the compressor valves off their seats, but which is controlled through a conduit 63 to cause the compressor to work when the air brakes are applied by admitting compressed air conventionally to a brake conduit 64 to which the added conduit section 63 is coupled.

The $CO_2$ exhaust pipe 60 enters the insulation space through a filter 65 around which a screen 66 is fitted in spaced relationship. The pipes 60 and 48 need not be readily flexible, as they enter the compressor at the pivotal axis 67 upon which the latter is connected to the body frame. When recompressing mechanism is not used, the $CO_2$ gas will overflow from the insulation 56 to atmosphere through a port in the top of the outer wall 55 (this port being sealed in the illustrated embodiment).

It is to be understood that the invention is not restricted to the previse methods and apparatus disclosed in detail, and that various changes may be made without departing from the spirit of the invention as set forth in the appended claims.

I claim:

1. In a method of the character described, the steps of releasing a liquefied gas in the form of a blast, supplying another liquid of lower freezing point to the blast and utilizing the kinetic energy of said blast to form therefrom a jet of atomized liquid, and directing said blast and said jet together in a defined path through a medium to be cooled.

2. In a method of the character described, the steps of providing a reservoir of liquefied $CO_2$ gas, releasing and expanding said gas while simultaneously mixing alcohol vapors or particles thoroughly therewith, and circulating the mixture in fog-like form through a conduit to lower the temperature thereof.

3. A method of refrigeration comprising the steps of expanding a liquefied gas rapidly, converting another liquid to an atomized state and thoroughly commingling the liquid particles with the expanding gas, circulating the mixture through a conduit to be cooled, recompressing the expanded gas for continued operation, and constantly reusing said other liquid.

4. In an apparatus of the character disclosed, a container for liquefied gas, a valve operable to release liquefied gas from the container, an expansion tube arranged to receive the blast released by said valve, a second reservoir containing a substance that is in liquid form at the temperatures in and adjacent said tube, a liquid atomizing device connected between said reservoir and said tube, and means for receiving the mixture discharged from said tube.

5. A refrigerating apparatus comprising an elongated means for effecting a controlled expansion of compressed gas, means for receiving the expanded gas and directing it in a predetermined path of circulation, means forming a chamber intersecting said path adjacent the first mentioned means and in restricted communication with the discharge end thereof, whereby partial recirculation is effected, and means for effecting escape of part of the gas from said chamber to a point outside the apparatus.

6. In combination, an ambulatory vehicle body having an internal closed chamber surrounded by heat insulation space, an underslung liquefied gas tank secured to said body, a wafer-like gas expansion unit secured to the body adjacent the ceiling of said chamber, means for feeding gas from said tank to said unit, and means for conveying expanded gas from said unit to said insulation space.

7. In the combination defined in claim 6, a gas compressor connected to said space to receive relatively warm expanded gas therefrom and connected to said tank to deliver recompressed gas thereto, and means for driving said compressor to decelerate the vehicle.

8. Apparatus of the character described, comprising a housing partially filled with liquid having a very low freezing point, an expansion unit comprising a tube in said housing above the liquid level, and a conduit having its intake end loosely surrounding one end of said tube and projecting to the exterior of the housing, a heat exchange unit connected to the discharge end of the conduit and to said housing, means for supplying liquefied gas to the other end of said tube, and means for establishing communication between the liquid of said housing and the interior of said expansion unit.

9. A method of refrigeration comprising the steps of converting a supply of liquefied gas into a blast of minute particles while simultaneously adding a jet of atomized liquid of lower freezing point than said liquefied gas to the blast, and causing the commingled fog of gaseous and liquid particles to circulate in confinement and at high velocity through an expansion and refrigerating chamber of sufficient capacity to fully gasify the liquefied gas.

10. In a refrigerating apparatus of the class described, a housing carrying means for introducing a stream of liquefied gas, an expansion tube arranged within the housing to receive said stream, a heat exchange unit connected to the housing and arranged to receive the discharge from said expansion tube, said housing containing adjacent said tube a reservoir of liquid that remains in liquid form under the low temperatures of operation adjacent the tube, means for feeding a jet of liquid from said reservoir into said expansion tube, and said heat exchange unit being designed and arranged to convey any liquid accumulated therein back into said housing at a point above said reservoir.

11. A method of refrigeration comprising the steps of converting a supply of liquid, that boils at and below normal atmospheric temperatures, into an expanding blast of gas; simultaneously adding adjacent the locus of conversion a spray of another liquid of higher boiling point to form particles of liquid in said blast of gas; and causing the commingled substances to circulate in confinement, with constant recirculation of the second mentioned liquid while removing at least some of the gas produced by the first mentioned liquid.

12. In a refrigerating apparatus of the class described, means for converting a liquefied gas into a high velocity blast of vapor, means for adding a jet of finely divided liquid particles to said blast, and a heat exchange unit arranged to receive the stream of commingled vapor and liquid particles and comprising a plurality of interconnected conduits disposed substantially in a common horizontal plane.

ALDEN G. RAYBURN.